UNITED STATES PATENT OFFICE.

WILLIAM KIEL, OF BUTLER, NEW JERSEY, ASSIGNOR TO KIEL, BUTLER & TURNBULL, OF NEW YORK, N. Y.

PROCESS OF MANUFACTURING VULCANIZED PLASTIC COMPOUNDS.

SPECIFICATION forming part of Letters Patent No. 412,266, dated October 8, 1889.

Application filed January 19, 1889. Serial No. 296,919. (Specimens.)

*To all whom it may concern:*

Be it known that I, WILLIAM KIEL, a citizen of the United States, residing at Butler, in the county of Morris, in the State of New Jersey, have invented an improved process of manufacturing vulcanized plastic compounds into which wood enters as an ingredient in large quantities, (for which compounds I have filed simultaneously herewith an application for Letters Patent,) of which the following is a specification.

My new process enables me to produce very superior vulcanized compounds, which if vulcanized so as to produce a hard substance can be used to great advantage in the place of hard rubber, whalebone, ivory, and even wood, and which if vulcanized so as to produce a soft substance can be used to take the place of soft rubber and its compounds, and which possess in each case very superior qualities.

My invention consists in the process of manufacturing vulcanized plastic compounds of which wood is a constituent part, by vulcanizing together wood and sulphur and subsequently combining by vulcanization the product thus obtained with oil or other commingling vulcanizable substance—sulphur and crude rubber. I have obtained the best results by vulcanizing the wood and sulphur as described above with a pressure of sixty pounds for a period of ten to twelve hours. The wood is first converted into some small form and all moisture removed from it, and, if necessary, any acids that may be in it are washed out of it. I use for this purpose crude rubber which has been washed and dried.

For the purpose of applying my invention, I work in with the requisite quantity of oil, sulphur, and crude rubber upon the heated rollers ordinarily used in the manufacture of rubber the mass of wood and sulphur vulcanized together, as above described. I thus obtain a compound which is ready for vulcanization. The time and the pressure applied in the process of vulcanizing hard rubber will if applied here produce a hard compound. In like manner the time of vulcanization and the pressure applied in the process of manufacturing soft rubber will if applied here produce a soft substance; but I do not confine myself to the limits within which these respective processes vary.

The quantity of sulphur to be added, as above stated, varies at about the rate of one-half a pound of sulphur for each pound of rubber with which my new compound is combined, and the quantity of oil varies with the quantity of sulphur at about the rate of two to four ounces of oil for each pound of sulphur added.

I do not claim the vulcanized plastic compounds which are the product of the herein-described process, as I have filed simultaneously herewith an application for Letters Patent for those compounds; and I do not limit myself to the proportions herein indicated, as I may vary them as occasion may require; but What I do claim, and desire to secure by Letters Patent, is—

1. The herein-described process of manufacturing vulcanized plastic compounds of which wood is a constituent part, which consists in vulcanizing together wood and sulphur and subsequently combining by vulcanization the product thus obtained with a commingling vulcanizable substance — sulphur and crude rubber—substantially as described.

2. The herein-described process of manufacturing vulcanized plastic compounds of which wood is a constituent part by vulcanizing together wood and sulphur and subsequently combining by vulcanization the product thus obtained with oil, sulphur, and crude rubber, substantially as described.

WILLIAM KIEL.

Witnesses:
SHERMAN EVARTS,
THOMAS HUNT.